May 18, 1965 P. J. WEAVER 3,183,929
CIRCUIT AND CONTROL
Filed Aug. 8, 1962
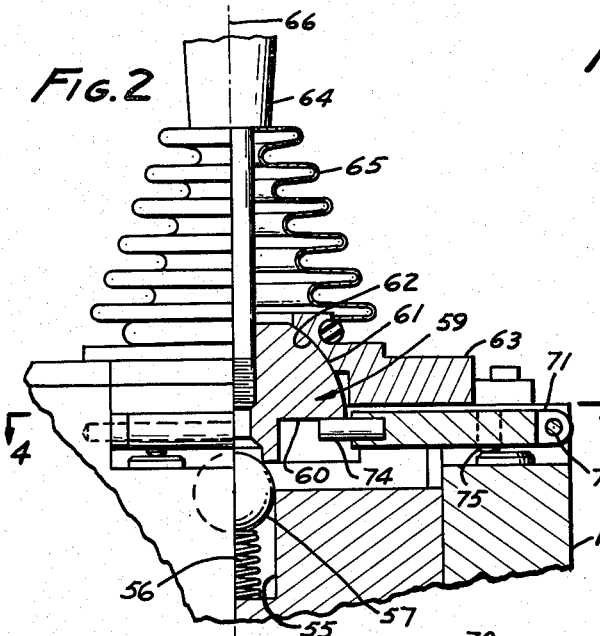
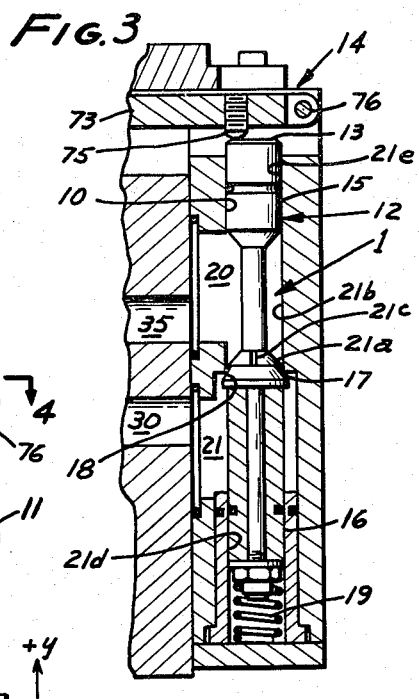
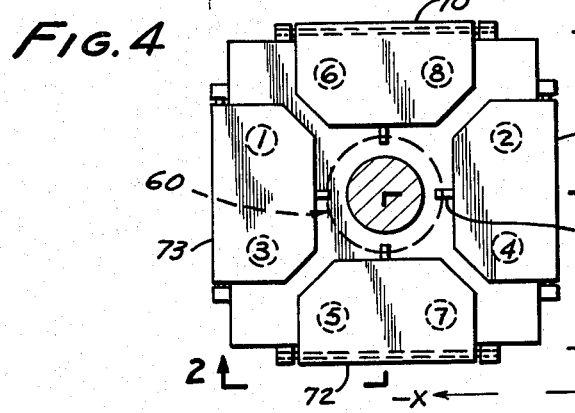
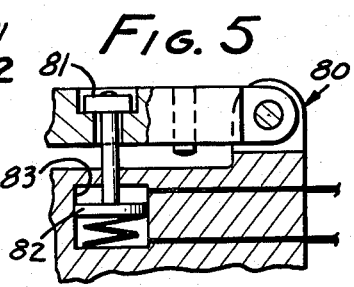
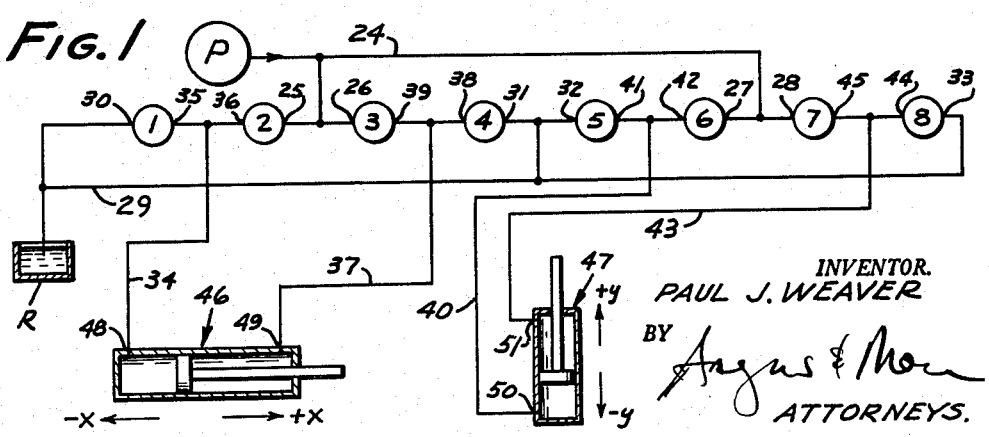
INVENTOR.
PAUL J. WEAVER
BY
ATTORNEYS.

United States Patent Office 3,183,929
Patented May 18, 1965

3,183,929
CIRCUIT AND CONTROL
Paul J. Weaver, Pasadena, Calif., assignor to True-Trace Corporation, El Monte, Calif., a corporation of Connecticut
Filed Aug. 8, 1962, Ser. No. 215,597
5 Claims. (Cl. 137—596.18)

This invention relates to a fluid motor control circuit and to a control therefor.

In the operation of a plurality of motors, one example being the simultaneous control of two orthogonally oriented fluid motors driving machine tool components along respective axes, it is often desired to take over control of the machine tool motor operation from an automatic control, in order to provide means for prepositioning or quickly traversing elements of the machine tool. It is convenient to be able to perform this operation by manipulating a single handle.

Devices for this purpose have heretofore been suggested, including ones involving pluralities of handles. However, they are in general complicated to operate and to build.

It is an object of this invention to provide a single-handle control valve, and an associated fluid circuit which can be built of simple poppet valves and inexpensive components, and which is inherently reliable and inexpensive to manufacture.

A control according to this invention includes a universally mounted pivot plate capable of operating valves in pairs for passing pressurized fluid to respective motors under control of the valves.

According to a preferred but optional feature of the invention, two pairs of valves are provided for each direction of movement along respective axes, one valve of each pair being provided to pass fluid under pressure and the other to pass exhaust fluid, said pairs of valves being actuated by movement of the pivot plate.

The above and other features of this invention will be fully understood from the following detailed description and the accompanying drawings in which:

FIG. 1 is a schematic illustration of the fluid circuit of this invention;

FIG. 2 is a fragmentary cross-section of the presently preferred embodiment of control according to the invention;

FIG. 3 is a cross-section of a valve component of the invention;

FIG. 4 is a cross-section taken at line 4—4 of FIG. 2; and

FIG. 5 is a fragmentary cross-section of an optional means for actuating the control.

FIG. 1 illustrates a preferred fluid circuit system for use with the valve of this invention. It includes a rank of eight valves 1–8, inclusive, of the poppet type best shown in FIG. 3. Each of these valves fits within a respective bore 10 in control body 11. Only valve 1 is shown in detail, the other valves being identical to it.

In valve 1, a poppet 12 has an end 13 adapted to be contacted by actuator means 14 to be described more fully below. It includes a pair of sealing lands 15, 16 at its opposite ends and a valve seal 17 in the middle. The bore includes a valve seat 18 adapted to be contacted by the seal. A spring 19 loads the poppet so that the seal tends to contact the seat and close off fluid communication between enlarged chambers 20, 21.

In addition to the shut-off feature, poppet valves 1–8 include an optional feature which provides for metering flow through the valves. Then the rate of flow can be roughly proportional to the angle through which a handle to be described is tilted. For this purpose, the poppet includes a conical shoulder 21a which narrowly clears the wall of bore 21b. The largest diameter portion of the shoulder is intended to be moved below seat 18, so that the clearance between seat and shoulder increases as the poppet is pushed downwardly. In addition, a notch 21c, or a plurality of them, can be provided for bypassing the largest diameter portion to increase the rate of flow at small poppet displacements from the shut-off position.

The poppet valves are pressure balanced, the diameters of bores 21b, 21d, 21e, and seat 18 being equal. Seal 17 makes a firm closure when seated on seat 18, and shoulder 21a performs a metering function, so that the poppets provide means for closely regulating fluid flow as a function of handle position.

In the position shown in FIG. 3, flow is shut off between the two conduits. Were the poppet to be depressed, fluid would pass through them, the rate being determined by the pressure of the fluid and by the axial displacement of the poppet. The valves are all normally closed, and are opened by actuating forces.

The valves are schematically illustrated in FIG. 1 as circles, the one side being the inlet, and the other being the outlet. Which is the inlet in this type of valve is immaterial, because the valves are pressure balanced. However, it will ordinarily be preferred to have the inlet on the upper side of the valve as shown in FIG. 3.

The valves are connected to each other in series. A pressure conduit 24 connects to inlet ports 25, 26, 27, 28 of valves 2, 3, 6 and 7. An exhaust manifold 29 connects to exhaust ports 30, 31, 32 and 33 of valves 1, 4, 5 and 8.

A motor supply line 34 connects to inlet port 35 of valve 1 and outlet port 36 of valve 2. A motor supply line 37 connects to inlet port 38 of valve 4 and outlet port 39 of valve 3. A motor supply line 40 connects to inlet port 41 of valve 5 and outlet port 42 of valve 6. A motor supply line 43 connects to inlet port 44 of valve 8 and outlet port 45 of valve 7.

Motors 46 and 47 are schematically illustrated as piston-cylinder combinations with motor supply ports 48, 49, 50, 51, respectively, on opposite sides of the pistons therein. These schematically illustrate motors suitable for driving machine tool components along respective axes. These motors could be rotary types instead of axial types, if preferred. Motor supply lines 34, 37, 40 and 43 are respectively connected to motor supply ports 48, 49, 50 and 51, so that each motor is connected to members of a pair of motor supply lines.

Poppet valves 1–8 are operated by the control shown in FIG. 2. This control, which lies within body 11, has a socket 55 within which a spring 56 is placed. A pivot ball 57 rests atop the spring and is biased upwardly by it to support a pivot plate 59. The pivot plate is essentially mushroom-shaped, having an overhanging shoulder 60 and an upper bearing surface 61 which is a fragment of a sphere. A socket 62 is formed by a cover 63 which is attached to the body. The center of the ball and the center of the bearing surface are coincident.

A handle 64 is attached to the pivot plate and a boot 65 excludes dust from the inside. It will be noted that the handle and the pivot plate are universally, tiltably mounted, that is to say, they may be tilted in all directions laterally relative to a vertical axis 66 which passes through the center of the pivot ball. Four hinge plates 70, 71, 72, 73 are hinged to the body and respectively overhang the following sets of pivot valves: 6, 8; 2, 4; 5,7; and 1,3.

Each pivot plate includes a pin 74 which stands beneath the overhanging shoulder 60, so that tilting the pivot plate in its direction will press down the pin 74, and through a pressure pin 75 closer to fulcrum 76 than pin 74, press down the poppets beneath the respective hinge plate. The respective pins are axially directed toward the axis, so that tilting the handle in the plane of any of them will press down only the respective hinge plate. However, compound motions may be derived by intermediate directional tilting of the handle, so that combinations of valve openings may be secured. Furthermore, because the pivots are inherently capable of metering the flow, the amount of flow, and therefore the speed of operation of the respective motors, is controllable by the extent to which the handle is pushed. Upward movement of the hinge plates above the neutral position is immaterial to the poppets, because the contact made between the seal and the seat limits upward poppet travel.

FIG. 5 illustrates a servo-mechanism 80 which may be utilized to exert force on the respective hinge plates. One of each of these mechanisms, which may be either incorporated into the body, or bolted thereto, is pin jointed to each hinge plate. Each mechanism includes a cross pin 81 for pulling the hinge plate down, and a piston 82 fitted within a cylinder 83. The lower portion of the cylinder is vented, while the upper portion is connected to some source of fluid under pressure which might be derived from servo valves or the like. The purpose of this device is for applications wherein the handle is not desired, and in which some remotely actuated provision might be used to supply a pressure signal to these mechanisms in order to actuate the poppet valves by moving the hinge plates.

The operation of this device will now be described. As can best be seen from the correlation between FIGS. 1 and 4 in which + and − x and y axes of movement are indicated, opening of valves 2 and 4 will cause movement along the +x axis, which would be derived from tilting the handle to the right in FIG. 4. Tilting the handle to the left in FIG. 4 will open valves 3 and 1 and cause movement in the −x axis. Tilting the handle toward the upper edge of FIG. 4 opens valves 6 and 8 and causes movement in the +y direction. Tilting the handle toward the lower edge of FIG. 4 opens valves 5 and 7 to cause movement in the −y direction.

Only movement in the +x direction will be discussed in detail, the other movements being readily derived from this example and the drawings. In this example, valves 2 and 4 will be opened by tilting the handle, in which event fluid will flow from pressure conduit 24 through valve 2 through motor supply line 34 and motor supply port 48, tending to move the plunger portion of motor 46 in the +x direction. At the same time, fluid expelled from motor 46 flows out motor supply port 49 through line 37, through valve 4 and into exhaust manifold 29 in reservoir R.

Assuming that a combination of movement in the +x and +y directions was desired, the handle could be moved diagonally upward and to the right in FIG. 4, thereby opening valves 2, 4, 6 and 8. In this case, the +x component will be derived as just described, while the +y component will be derived by flow from pressure conduit 24 through valve 6, motor supply line 40, motor supply port 50, thereby tending to move the piston in the +y direction. Expelled fluid from motor 47 will flow out motor supply port 51, motor supply line 43, through valve 8 and into the exhaust manifold and reservoir.

The term "pairs" is sometimes used herein. This term denotes a pair of valves effective to control the fluid circuit through the motor, and *not* a "set" of two valves under a hinge plate.

The "pairs" of valves are: first pair: 1 and 2, second pair: 3 and 4, third pair: 5 and 6, and fourth pair 7 and 8. The "first" valves whose inlets are connected to a pressure source are valves 2, 3, 6 and 7; the "second" valves whose outlets are connected to exhaust are valves 1, 4, 5 and 8.

The motor supply lines referred to as specific pairs are lines 34 and 37, and lines 40 and 43. Lines 34, 37, 40 and 43 are respective to the first, second, third and fourth pairs, respectively. Valves from the first and second pairs, and valves from the third and fourth pairs, are selectively actuated to operate on the pairs of motor supply lines 34, 37 and 40, 43, respectively. The actuating means selects a first valve from one pair and a second valve from the other pair of valves respective to the same set of lines.

Reverse movements of the handle will cause reverse movements of the motors. When the handle is axially oriented, all valves are closed and no motion occurs.

As can be seen from the foregoing, this valve is one of great simplicity and convenience both in manufacture and in operation. Compound movement of a "joystick" nature for controlling a plurality of machine tool slides, or for controlling motors for any purpose, can readily be derived based upon eight simple poppet valves and a simply mounted universally tiltable pivot plate. It will further be recognized that the valves in pairs can be mounted on a single poppet stem, if desired, because they actuate in pairs simultaneously, but in routine construction it is usually found simpler to provide the valves as pairs of individual valves.

This invention is not to be limited by the embodiments shown on the drawings and described in the description which are given by way of example and not of limitation, but only in accordance with the scope of the appended claims.

I claim:

1. A plural axis control for controlling the flow of pressurized fluid from a source of pressurized fluid to exhaust comprising: a first and a second pair of motor supply lines; four pairs of normally-closed valves, each of said valves having an inlet port and an outlet port, the inlet port of a first valve of each said pair of valves being connected to the said source, and the outlet port of each of said first valves being connected to a respective motor supply line and to the inlet port of the second valve of its respective pair, the outlet port of each first valve and the inlet port of the second valve of the same pair thereby being connected to a respective one of said motor supply lines, each of said pairs of motor supply lines being so connected to the valves of two different pairs of valves, the outlet port of each of said second valves being connected to said exhaust; and means for actuating a first valve of a pair connected to the motor supply line of one pair of lines and the second valve of the other pair of valves connected to the other of the motor supply lines in the same pair of motor supply lines, thereby selectively to supply fluid under pressure to a selected one of a selected pair of motor supply lines, and to connect the other motor supply line of the selected pair of lines to exhaust, the said means being adapted to select the first valve of any pair and simultaneously the second valve of the other pair of valves which is associated with the same pair of motor supply lines, the means for actuating said valves comprising four hinged plate means each operably overhanging two valves which are thus selectible, and a fluid-actuated actuator operable on respective hinge plate means.

2. A plural axis control for controlling the flow of pressurized fluid from a source of pressurized fluid to exhaust comprising: a first and a second pair of motor supply lines; four pairs of normally-closed valves, each of said valves having an inlet port and an outlet port, the inlet port of a first valve of each said pair of valves being connected to the said source, and the outlet port of each of said first valves being connected to a respective motor supply line and to the inlet port of the second valve of its respective pair, the outlet port of each first valve and the inlet port of the second valve of the same pair thereby being connected to a respective one of said motor supply lines, each of said pairs of motor supply lines being so connected to the valves of two different pairs of valves, the outlet port of each of said second valves being connected to said exhaust; and means for actuating a first valve of a pair connected to the motor supply line of one pair of lines and the second valve of the other pair of valves connected to the other of the motor supply lines in the same pair of motor supply lines, thereby selectively to supply fluid under pressure to a selected one of a selected pair of motor supply lines, and to connect the other motor supply line of the selected pair of lines to exhaust, the said means being adapted to select the first valve of any pair and simultaneously the second valve of the other pair of valves which is associated with the same pair of motor supply lines, the means for actuating said valves comprising a universally tiltable pivot plate, and four hinge plate means operably overhanging valves which are thus selectible, said hinge plate means and pivot plate being so disposed and arranged that tilting movement of the pivot plate toward the respective hinge plate means moves the hinge plate means and thus actuates and opens the selected valves.

3. A control according to claim 2 in which the valves are poppet type valves which permit flow therethrough as a function of poppet displacement and pressure.

4. A control according to claim 2 in which the pivot plate is mounted to a ball, and in which each hinge plate means includes a pin with its axis aligned toward the ball, whereby movement of the pivot plate around the ball as a center creates valve actuation proportional to the component of pivot plate movement in the direction of the respective pairs of vales.

5. A control according to claim 2 in which each of the valves is a pressure-balanced poppet valve wherein fluid pressure in the lines is essentially ineffective to cause the valve to assume any particular position.

References Cited by the Examiner
UNITED STATES PATENTS

| | | | |
|---|---|---|---|
| 2,275,963 | 3/42 | Herman et al. | 137—636 XR |
| 2,377,115 | 5/45 | Van der Werff | 91—414 |
| 2,409,765 | 10/46 | Kehle | 137—636 |

MARTIN P. SCHWADRON, *Acting Primary Examiner.*

MILTON KAUFMAN, *Examiner.*